(12) United States Patent
Bentabet et al.

(10) Patent No.: US 10,572,588 B2
(45) Date of Patent: Feb. 25, 2020

(54) EXTRACTING FROM A DESCRIPTIVE DOCUMENT THE VALUE OF A SLOT ASSOCIATED WITH A TARGET ENTITY

(71) Applicant: FORTIA FINANCIAL SOLUTIONS, Paris (FR)

(72) Inventors: Najah-Imane Bentabet, Montreuil (FR); Youness Mansar, La Garenne-Colombes (FR); Guillaume Hubert, Paris (FR); Willy Man Soon Au, Alfortville (FR); Sira Ferradans, Paris (FR)

(73) Assignee: FORTIA FINANCIAL SOLUTIONS, Paris (FR)

( * ) Notice: Subject to any disclaimer, the term of this patent is extended or adjusted under 35 U.S.C. 154(b) by 0 days.

(21) Appl. No.: 16/044,563

(22) Filed: Jul. 25, 2018

(65) Prior Publication Data

US 2019/0370327 A1    Dec. 5, 2019

(30) Foreign Application Priority Data

Jun. 1, 2018   (EP) ..................................... 18305676

(51) Int. Cl.
    *G06F 17/27*    (2006.01)
    *G06F 16/35*    (2019.01)
    *G06F 16/335*   (2019.01)

(52) U.S. Cl.
    CPC .......... *G06F 17/278* (2013.01); *G06F 16/335* (2019.01); *G06F 16/35* (2019.01); *G06F 17/2795* (2013.01)

(58) Field of Classification Search
    None
    See application file for complete search history.

(56) References Cited

U.S. PATENT DOCUMENTS 7,747,427 B2 * 6/2010 Lee ..................... G06F 17/2818
                                                          704/1
8,335,754 B2 * 12/2012 Dawson .............. G06F 17/2705
                                                          706/45
(Continued)

FOREIGN PATENT DOCUMENTS

CN          107291795 A     10/2017
EP            2172849 A1     4/2010

OTHER PUBLICATIONS

Mansar Youness et al "Fortia-FBK at SemEval-2017 Task 5: Bullish or Bearish, Inferring Sentiment towards Brands from Financial News Headlines" arxiv.org. Cornell University Ithaca, NY 14853 Apr. 4, 2017 (Apr. 4, 2017), XP 080760585.

(Continued)

*Primary Examiner* — Satwant K Singh
(74) *Attorney, Agent, or Firm* — Yasser Mourtada (57) ABSTRACT

Methods, systems, and computer program products for extracting from a descriptive document the value of a slot associated with a target entity described in the descriptive document are disclosed. The descriptive document is split into a set of sentences, and the sentences are filtered to generate a set of candidate sentences. Candidate sentence-entity pairs are determined from the candidate sentences, where each candidate sentence-entity pair includes a candidate sentence and an associated entity of the same type as the slot. The candidate sentence-entity pairs are compared to a set of gold sentences associated with the slot to calculate a plurality of similarity measures. A candidate sentence-entity pair associated with a maximum similarity measure is determined, and the value of the associated entity of the determined candidate sentence-entity pair is assigned to the slot.

20 Claims, 4 Drawing Sheets

(56) References Cited

U.S. PATENT DOCUMENTS

| | | | |
|---|---|---|---|
| 8,666,987 B2* | 3/2014 | Noh | G06F 17/2745 707/737 |
| 8,756,185 B2* | 6/2014 | Dawson | G06F 17/2705 706/45 |
| 10,332,012 B2* | 6/2019 | Reddy | G06N 5/04 |
| 2009/0012842 A1* | 1/2009 | Srinivasan | G06F 16/3344 705/12 |
| 2009/0240687 A1* | 9/2009 | Eskebaek | G06F 16/338 |
| 2015/0095770 A1* | 4/2015 | Mani | G06F 17/2745 715/254 |
| 2015/0127323 A1 | 5/2015 | Jacquet et al. | |
| 2017/0308790 A1 | 10/2017 | Nogueira dos Santos et al. | |
| 2018/0018322 A1* | 1/2018 | Mukherjee | G06F 17/2785 |
| 2018/0060302 A1* | 3/2018 | Liang | G06F 17/277 |
| 2018/0173698 A1* | 6/2018 | Dubey | G06F 16/3347 |
| 2018/0196804 A1* | 7/2018 | Mani | G06F 17/2745 |

OTHER PUBLICATIONS

Staiano Jacopo et al: "DepecheMood: a Lexicon for Emotion Analysis from Crowd-Annotated News", Proceedings of the 52nd Annual Meeting of the Association for Computational Linguistics (Short Papers), May 7, 2014 (May 7, 2014), pp. 427-433 XP055483290.

Yoon Kim Convolutional Neural Networks for Sentence Classification arXiv preprint arXiv:1408.5882, 2014.

Yoon Kim "Instantly share code, notes, and snippets. Convolutional Neural Network For Sentence Classification Introduction", 2016, XP055483311.

English Language Translation of CN 107291795A.

Pasca et al., "Organizing and Searching the Word Wide Web of Facts—Step One: the One-Million Fact Extraction Challenge," Proceedings of 21st National Conference on Artificial Intelligence (AAAI-06), Jul. 16, 2006.

Auger et al., "Pattern-based approaches to semantic relation extraction: A state-of-the-art," Terminology, 14, 1, pp. 1-19, Dec. 15, 2008.

* cited by examiner

FIG.6

EXTRACTING FROM A DESCRIPTIVE DOCUMENT THE VALUE OF A SLOT ASSOCIATED WITH A TARGET ENTITY

CROSS-REFERENCE TO RELATED APPLICATIONS

This present application claims priority to European Patent Application No. 18 305 676.1, filed on Jun. 1, 2018, which is incorporated herein by reference in its entirety.

FIELD

The present disclosure relates to the field of electronic document processing.

TECHNICAL BACKGROUND

Slot filling (SF) is a process by which predefined attributes (slot values) of a target entity are extracted from a large collection of natural language text. Generally, SF involves two steps: a Named Entity Recognition (NER) step by which entities of interest (which can be organizations, persons, numerical values, locations, etc.) are located, and a relationship extraction step by which relationships between the target entity and other entities of interest (potentially the slot values) are determined.

One requirement of SF is the presence of multiple independent documents in which the desired information between the target entity and the slot values being extracted is mentioned. This is because SF requires that the target relationship, i.e., the relationship of interest between the target entity and the slot being filled, to be more prominent than other relationships between the target entity and the slot being filled. For example, if the target relationship is that Obama 'was born in' Hawaii, then SF would need that this relationship be present more prominently in the text collection than other relationships such as Obama 'lived in' Hawaii or Obama 'visited' Hawaii, for example.

Another requirement of SF is that the entities, particularly the target entity, be explicitly mentioned in the text. Further, SF typically operates on unstructured text, i.e., plain natural language sentences.

Besides, relationship extraction in SF typically relies on machine learning techniques that require a large amount of training data, that is, sentences in which the entities are tagged (typically manually) and in which their relationships appear.

These requirements are restrictive for certain applications. For example, in some cases, the target entity may be described in a small corpora, e.g., a single document, and the information to be extracted (i.e., the information between the target entity and the slot value) may be mentioned only a few times (e.g., less than 3 times) in the document.

Additionally, the document may be a descriptive document, in which the target entity is mentioned implicitly (latent) or with an alias. For instance, in an investment fund prospectus, the name of the fund (i.e., the target entity) is latent or referred to by an alias. To fill in a slot (e.g., the fund's depository) from the investment fund prospectus, sentences that do not mention the name of the fund (e.g., "The Depository assigned is Bank A") or sentences that refer to the name of the fund by an alias (e.g., "The Depository of the fund is Bank B"—the "fund" being the alias) need to be used. This is in contrast to SF in which the corpora explicitly states the target entity. For example, if the slot being filled is country_of_birth for the target entity Michelle Obama, the corpora used in SF would include sentences such as "Michelle Obama was born in Chicago, Ill." which explicitly state the target entity.

The information may also be provided as semi-structured text in some cases. For example, instead of having the information in a full sentence, the relationship between the entities may be provided as a form (e.g., "Depository: Bank A").

Finally, tagged data (which is typically tagged manually), large amounts of which is needed for SF, may not always be available and is expensive and time consuming to generate.

There is a need therefore for an information extraction method that addresses one or more of the above described deficiencies of SF.

SUMMARY

The present disclosure provides a method for extracting, from a descriptive document describing a target entity, the value of a slot associated with the target entity. The method comprises:

splitting the descriptive document into a set of sentences;

filtering the set of sentences to generate a set of candidate sentences, the set of candidate sentences each comprising at least one entity having a slot entity type (SET) of the slot;

determining candidate sentence-entity pairs from the set of candidate sentences, wherein each candidate sentence-entity pair includes a candidate sentence and an associated entity, the associated entity contained in the candidate sentence and having the SET of the slot;

calculating a plurality of similarity measures between the determined candidate sentence-entity pairs and a set of gold sentences associated with the slot, wherein calculating the plurality of similarity measures comprises:

for each candidate sentence-entity pair of the determined candidate sentence-entity pairs, calculating a similarity measure with each gold sentence of the set of gold sentences;

determining a candidate sentence-entity pair associated with a maximum similarity measure among the plurality of similarity measures; and assigning a value of the associated entity of the determined candidate sentence-entity pair to the slot.

By filtering the set of sentences to generate a set of candidate sentences, only the sentences that contain relevant information for the slot being filled are maintained. Processing time of the descriptive document can thus be significantly reduced.

In an embodiment, filtering the set of sentences to generate the set of candidate sentences comprises determining that a sentence of the set of sentences is a candidate sentence if the sentence comprises a trigger word associated with the slot. In an embodiment, the trigger word includes a synonym of a name of the slot. A list of trigger words associated with the slot may be pre-defined depending on the type of descriptive document and slots being filled based on the descriptive document. This allows control over the candidate sentence selection process by adjusting the list of trigger words associated with a slot.

In another embodiment, filtering the set of sentences to generate the set of candidate sentences comprises: classifying a sentence of the set of sentences to determine a classifier output class for the sentence; and determining that the sentence is a candidate sentence if the classifier output class matches a tag associated with the slot. This approach allows for an over-the-shelf classifier to be used for candidate sentence selection and does not require pre-definition of trigger words for each slot.

In an embodiment, the set of gold sentences associated with the slot comprises sentences that contain the name of the slot. The use of the gold sentences allows for slot value extraction without need for a large amount of manually tagged data as is typically done in SF methods. Additionally, the gold sentences can be readily updated in real-time by a user, resulting in faster reactivity to errors.

In an embodiment, the extraction method further comprises replacing the name of the slot with the SET of the slot in the set of gold sentences. For example, the gold sentence "The Asset Manager is Company A " is converted to "The Asset Manager is 'Organization'". This allows the gold sentences to remain generic and thus easier to compare with candidate sentences.

The determination of candidate sentence-entity pairs from the candidate sentences, wherein each candidate sentence-entity pair includes a candidate sentence and an associated entity contained in the candidate sentence and having the SET of the slot, recognizes that a candidate sentence may include more than one entities tagged with the SET of the slot. As each of these entities may provide the value for the slot, testing is done on a candidate sentence-entity pair level rather than on a candidate sentence level only.

In an embodiment, calculating a similarity measure with a gold sentence for a candidate sentence-entity pair comprises:

determining, based on the candidate sentence of the candidate sentence-entity pair, a first relationship between the associated entity of the candidate sentence-entity pair and a trigger word associated with the slot contained in the candidate sentence;

determining, based on the gold sentence, a second relationship between a name of the slot contained in the gold sentence and an entity contained in the gold sentence having the SET of the slot; and comparing the first relationship to the second relationship to determine the similarity measure between the gold sentence and the candidate sentence-entity pair.

Determining the first relationship may comprise: generating a dependency tree of the candidate sentence; and computing, using the dependency tree of the candidate sentence, a first shortest path between the associated entity and the trigger word associated with the slot contained in the candidate sentence.

Determining the second relationship may comprise: generating a dependency tree of the gold sentence; and computing, based on the dependency tree of the gold sentence, a second shortest path between the name of the slot and the SET entity contained in the gold sentence.

In an embodiment, comparing the first relationship to the second relationship comprises computing a similarity function between the first shortest path and the second shortest path. The similarity function may be a Simple Approximate Bigram Kernel (SABK) function.

The descriptive document may be any type of document describing a target entity. For example, the descriptive document may be a prospectus describing an investment fund.

In another aspect, embodiments provides a non-transitory computer readable medium having control logic stored thereon, the control logic when executed by a processor causes the processor to perform a method for extracting, from a descriptive document describing a target entity, the value of a slot associated with the target entity according to any of the method embodiments described above.

In a further aspect, embodiments provide a computer system, comprising a processor and a memory storing control logic, the control logic when executed by the processor causes the processor to perform a method for extracting, from a descriptive document describing a target entity, the value of a slot associated with the target entity according to any of the method embodiments described above.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DETAILED DESCRIPTION OF EXAMPLE EMBODIMENTS

Embodiments of the present disclosure provide systems, methods, and computer program products for extracting from a descriptive document the values of one or more slots associated with a target entity. The descriptive document may be a document that describes the target entity implicitly or using an alias. Using only a list of trigger words and a set of gold sentences for each slot, the slot value is automatically extracted from the descriptive document with the descriptive document as the only source of information. In one example, the descriptive document may be an investment fund prospectus and the target entity is the name of the investment fund. The slot values that are extracted are attributes of the investment fund.

Figure 1:
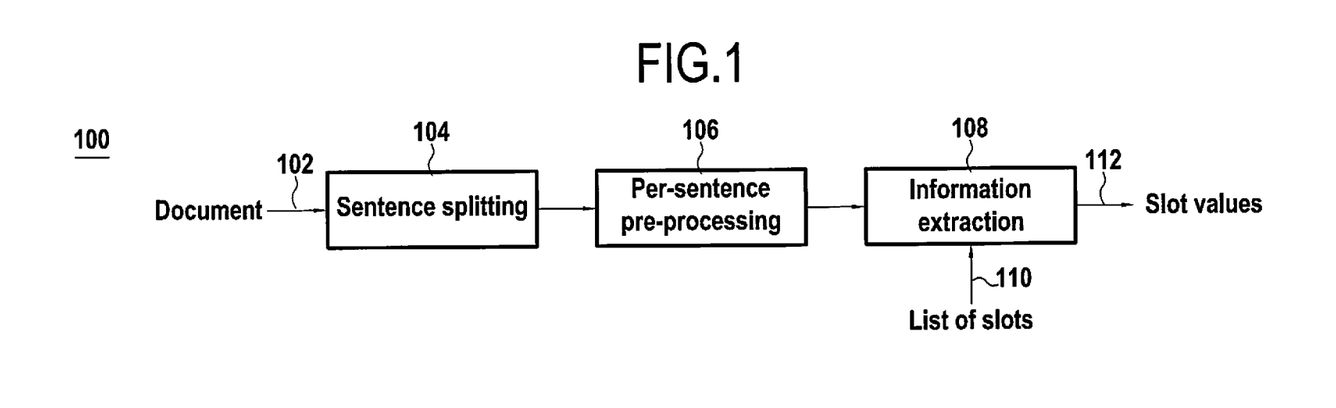
FIG. 1 illustrates an example process for extracting slot values associated with a target entity from a descriptive document according to an embodiment.

FIG. 1 illustrates an example process 100 for extracting slot values associated with a target entity from a descriptive document 102 according to an embodiment. Example process 100 is provided for the purpose of illustration only and is not limiting of embodiments of the present disclosure. In embodiments, the descriptive document 102 may be any type of document. The descriptive document 102 describes the target entity and includes values of slots (i.e., fields) associated with the target entity. The descriptive document 102 may implicitly mention the target entity or refer to it using an alias. The target entity may be of any nature such as a product, a company, an organization, etc. In an example embodiment, the descriptive document 102 is a prospectus describing an investment fund and the target entity is the name of the investment fund. The slots are attributes of the investment fund (e.g., Investment Manager, Registrar, etc.) whose values are provided in the prospectus.

As shown in FIG. 1, process 100 begins in step 104, which includes splitting the descriptive document 102 into a set of sentences. Next, in step 106, the set of sentences are pre-processed sentence-by-sentence. This may include replacing predefined sets of characters or elements by respective codes. For example, URLs or percentages may be replaced with the respective codes 'URL' and 'PERC'. Finally, in step 108, information is extracted from the pre-processed set of sentences. Step 108 uses a list of slots 110 which indicates the slots whose values are to be extracted from the descriptive document 102. The output of step 108 is a list of slot values 112 corresponding to the list of slots 110.

Figure 2:
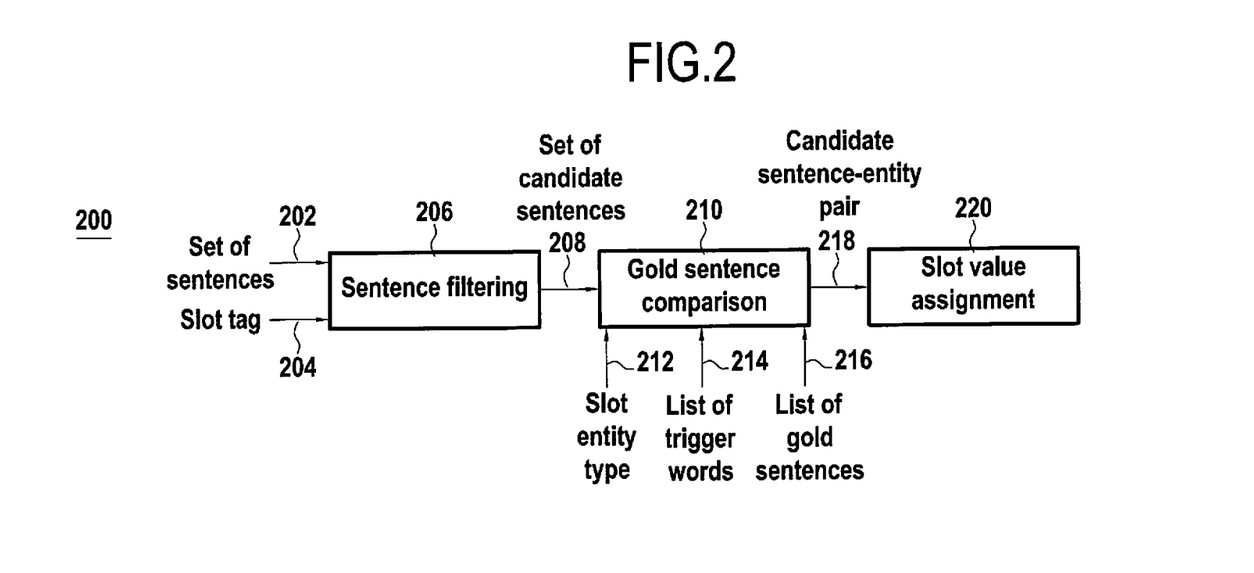
FIG. 2 illustrates an example process for assigning a value to a slot based on a set of sentences and a set of gold sentences associated with the slot according to an embodiment.

FIG. 2 illustrates an example process 200 for assigning a value to a slot based on a set of sentences 202 and a set of gold sentences 216 associated with the slot according to an embodiment. Example process 200 is provided for the purpose of illustration only and is not limiting of embodiments of the present disclosure. Example process 200 may be an embodiment of steps 106 and 108 of process 100 described above. In an embodiment, process 200 is performed for each slot whose value is being extracted from the descriptive document.

As shown in FIG. 2, process 200 begins in step 206, which includes filtering the set of sentences 202. In an embodiment, the set of sentences 202 correspond to pre-processed sentences that result from pre-processing step 106 of process 100 described above. In an embodiment, the sentence filtering receives as input the set of sentences 202 and a slot tag 204 and generates a set of candidate sentences 208 for the slot. The slot tag 204 is the given name of the slot (e.g., "Asset Manager"). In an embodiment, the set of candidate sentences each comprises at least one entity having a type that corresponds to a slot entity type (SET) of the slot. For example, if the SET of the slot is "Organization" then a candidate sentence would include an entity (i.e., one or more words) of the SET of the slot.

According to embodiments, sentence filtering step 206 may be performed according to two approaches as further described below with reference to FIGS. 3A and 3B.

Next, process 200 proceeds to step 210, which includes comparing the set of candidate sentences 208 with the set of gold sentences 216 associated with the slot to determine an optimal candidate sentence from which to extract the slot value. The set of gold sentences 216 associated with the slot comprises sentences that contain the name of the slot. For example, if the slot being extracted is "Investment Manager" a gold sentence for the slot would be a sentence having the term "Investment Manager" therein. In an embodiment, the sentences that make up the set of gold sentences 216 are chosen to be grammatically different from each other. The set of gold sentences 216 may be selected from real-life descriptive documents. In an embodiment, in order to keep the gold sentences generic, the name of the slot in the gold sentences is replaced with the SET of the slot. For example, the gold sentence "The Asset Manager is Company A" is converted to "The Asset Manager is 'Organization'". This allows the gold sentences to remain generic and thus easier to compare with candidate sentences.

In an embodiment, it is recognized that candidate sentences may include more than one entity having the SET of the slot. The comparison of the candidate sentences with the gold sentences is therefore performed on a candidate sentence-entity pair basis. In other words, a given candidate sentence including multiple entities with the SET of the slot is compared multiple times with the gold sentences, each time with respect to one of the multiple entities contained therein. This embodiment is reflected in FIG. 2, in which gold sentence comparison step 210 receives as input the set of candidate sentences 208, the SET 212 of the slot, a list of trigger words 214 associated with the slot (e.g., synonyms of a name of the slot), and the set of gold sentences 216 associated with the slot, and outputs a candidate sentence-entity pair 218 for slot value assignment.

In an embodiment, as further described with reference to FIG. 4 below, step 210 includes determining candidate sentence-entity pairs from the set of candidate sentences 208, where each candidate sentence-entity pair includes a candidate sentence and an associated entity contained in the candidate sentence and having the SET of the slot; and calculating a plurality of similarity measures between the determined candidate sentence-entity pairs and the set of gold sentences 216 associated with the slot. Similarity measure calculation for a candidate sentence-entity pair with a gold sentence associated with the slot is further described below with reference to FIG. 5.

The candidate sentence-entity pair 218 that is output by step 210 represents the candidate sentence-entity pair with the maximum similarity measure among the plurality of calculated similarity measures. In other words, the candidate-sentence-entity pair 218 has an optimal match with a sentence of the set of the gold sentences 216. Accordingly, in step 220, the value of the associated entity of the candidate-sentence-entity pair 218 is assigned to the slot being filled.

Figure 3A:
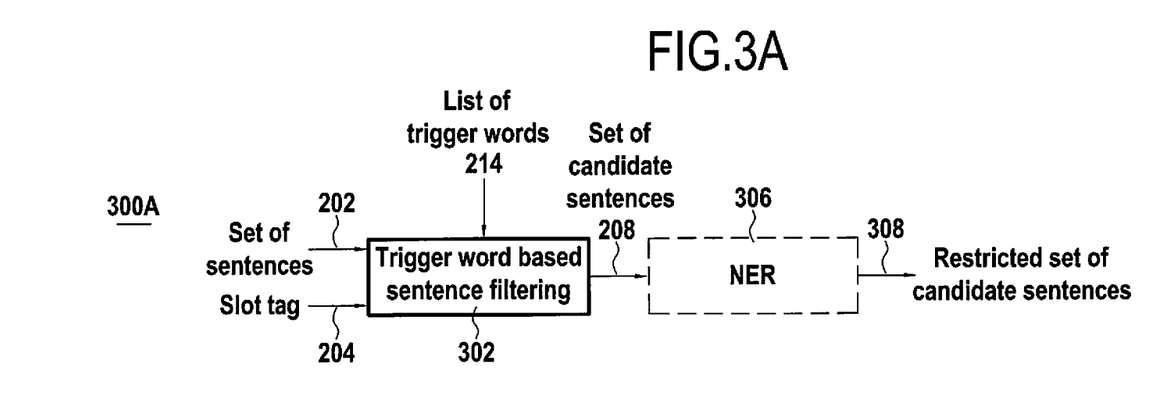
FIG. 3A illustrates an example process for filtering a set of sentences to generate a set of candidate sentences according to an embodiment.

FIG. 3A illustrates an example process 300A for filtering a set of sentences to generate a set of candidate sentences according to an embodiment. Example process 300A is provided for the purpose of illustration only and is not limiting of embodiments of the present disclosure. Example process 300A may be an embodiment of sentence filtering step 206 described above with reference to FIG. 2. As discussed above, sentence filtering is performed on a slot-by-slot basis to generate candidate sentences for each slot.

As shown in FIG. 3A, process 300A includes a trigger word-based sentence filtering step 302 and an optional Named Entity Recognition (NER) step 306. Step 302 receives as input the set of sentences 202, the slot tag 204, and the list of trigger words 214 associated with the slot and generates the set of candidate sentences 208 for the slot. In an embodiment, filtering the set of sentences 202 to generate the set of candidate sentences 208 comprises, for each sentence of the set of sentences 202, determining if the sentence comprises a trigger word from the list of trigger words 214 associated with the slot and determining that the sentence is a candidate sentence if the sentence comprises a trigger word associated with the slot.

Optional NER step 306 may be used to further restrict the set of candidate sentences 208. Specifically, NER step 306 tags the entities of each candidate sentence with pre-defined types (e.g., Organization, Person, Location, etc.) and filters the candidate sentences 208 to keep only those sentences that contain an entity having the SET of the slot. For example, if the slot being filled is "Asset Manager" (i.e., SET=Organization), the restricted set of candidate sentences 308 would each include at least one entity tagged as "Organization" in NER step 306.

Figure 3B:
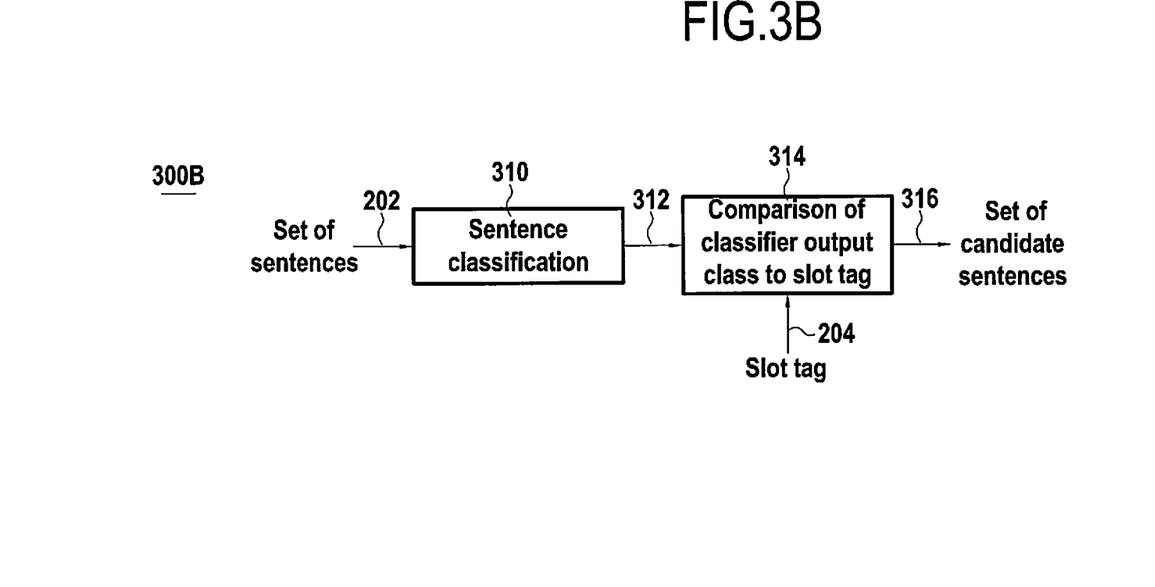
FIG. 3B illustrates another example process for filtering a set of sentences to generate a set of candidate sentences according to an embodiment.

FIG. 3B illustrates another example process 300B for filtering a set of sentences to generate a set of candidate sentences according to an embodiment. Example process 300B is provided for the purpose of illustration only and is not limiting of embodiments of the present disclosure. Example process 300B may be an embodiment of sentence filtering step 206 described above with reference to FIG. 2. As discussed above, sentence filtering is performed on a slot-by-slot basis to generate candidate sentences for each slot.

As shown in FIG. 3B, process 300B includes a sentence classification step 310 and a comparison step 314. Sentence classification step 310 receives the set of sentences 202 and generates an output 312 including a classifier output class for each sentence. Comparison step 314 compares the classifier output class of each sentence to the slot tag 204 associated with the slot, and determines that the sentence is a candidate sentence if the classifier output class matches the slot tag 204.

In embodiments, either of process 300A or 300B may be used to perform the sentence filtering. In an embodiment, the filtering process is selected per slot based on the type of the slot being filled. In another embodiment, the same filtering slot is used for all slots being filled.

As noted above, in an embodiment, it is recognized that candidate sentences may include more than one entity having the SET of the slot. The comparison of the candidate sentences with the gold sentences to determine the value of the slot is therefore performed on a candidate sentence-entity pair basis.

Figure 4:
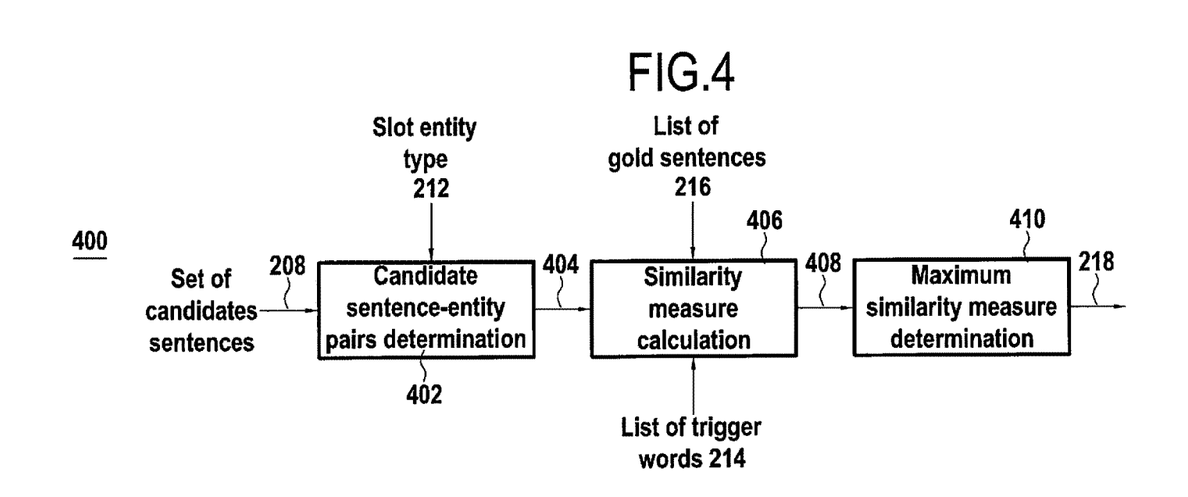
FIG. 4 illustrates an example process for determining a candidate sentence-entity pair with a maximum similarity measure according to an embodiment.

FIG. 4 illustrates an example process 400 for determining a candidate sentence-entity pair with a maximum similarity measure according to an embodiment. Example process 400 is provided for the purpose of illustration only and is not limiting of embodiments of the present disclosure. Example process 400 may be an embodiment of step 210 described above with reference to FIG. 2. As shown in FIG. 4, process 400 includes a candidate sentence-entity pairs determination step 402, a similarity measure calculation step 406, and a maximum similarity measure determination step 410.

Step 402 includes receiving the set of candidate sentences 208 associated with the slot being filled and the SET 212 of the slot and determining candidate sentence-entity pairs 404 from the set of candidate sentences 208. Specifically, each candidate sentence is processed to determine one or more candidate sentence-entity pairs based on the candidate sentence. Each candidate sentence-entity pair includes the candidate sentence and an associated entity, the associated entity contained in the candidate sentence and having the SET of the slot.

Each candidate sentence may result in one or more candidate sentence-entity pairs depending on the number of entities in the sentence having the SET of the slot. For example, if the slot being filled has a SET equal to "Organization" and the candidate sentence is "The asset management company Company A is assigning as custodian the company Company B" then two candidate sentence-entity pairs would be generated. The first would consist of the candidate sentence and the associated "Organization" entity 'Company A' and the second would consist of the candidate sentence and the associated "Organization" entity 'Company B.'

Similarity measure calculation step 406 includes calculating a plurality of similarity measures 408 between the determined candidate sentence-entity pairs 404 and the set of gold sentences 216 associated with the slot. In an embodiment, step 406 includes, for each candidate sentence-entity pair of the determined candidate sentence-entity pairs 404, calculating a similarity measure with each gold sentence of the set of gold sentences 216.

In an embodiment, calculating a similarity measure with a gold sentence for a candidate sentence-entity pair includes: determining, based on the candidate sentence of the candidate sentence-entity pair, a first relationship between the associated entity of the candidate sentence-entity pair and a trigger word associated with the slot contained in the candidate sentence; determining, based on the gold sentence, a second relationship between a name of the slot contained in the gold sentence and an entity contained in the gold sentence having the SET of the slot; and comparing the first relationship to the second relationship to determine the similarity measure between the gold sentence and the candidate sentence-entity pair.

For example, assuming that the slot being filled is the "Depository" of a fund and that the candidate sentence is "The asset manager Mr. Smith has assigned as custodian the company A." In this example, the term "custodian" is a trigger word for the "Depository" slot. The associated entity in this example candidate sentence is "the company A" because it has the SET of the slot being filled (Organization). Thus, the first relationship that is determined in this example is the relationship between the term "the company A" and the term "custodian" in the candidate sentence.

Continuing with the above example, the gold sentence would have the term "depository" (i.e., the name of the slot) in it. For example, the gold sentence may be "The custodian is Company B." The "Company B" is the entity having the SET of the slot (Organization) in the gold sentence. Thus, the second relationship that is determined would be the relationship between the term "custodian" and the term "Company B" in the gold sentence. The two relationships are compared to determine how similar the candidate sentence-entity pair is to the gold sentence.

An example approach for determining the first and second relationships and calculating the similarity measure between a candidate sentence-entity pair and a gold sentence is described further below with reference to FIG. 5.

Returning to process 400, step 410 includes receiving the plurality of similarity measures 408 calculated in step 406 and determining a candidate sentence-entity pair 218 associated with a maximum similarity measure among the plurality of similarity measures 408. The candidate-sentence-entity pair 218 has an optimal match with a sentence of the set of the gold sentences 216. The value of the associated entity of the candidate-sentence-entity pair 218 is assigned to the slot being filled.

Figure 5:
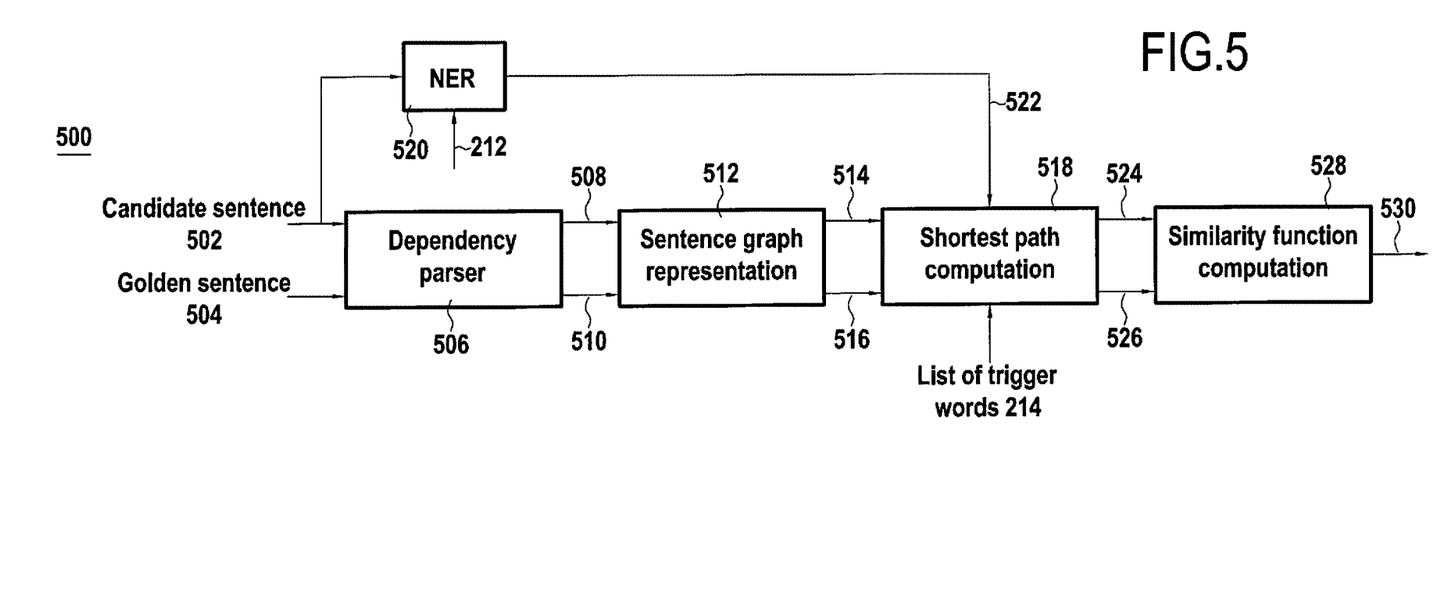
FIG. 5 illustrates an example process for calculating a similarity measure between a candidate sentence-entity pair and a gold sentence according to an embodiment.

FIG. 5 illustrates an example process 500 for calculating a similarity measure between a candidate sentence-entity pair and a gold sentence according to an embodiment. Example process 500 is provided for the purpose of illustration only and is not limiting of embodiments of the present disclosure. Example process 500 may be an embodiment of similarity measure calculation step 406 described above with reference to FIG. 4. In an embodiment, within step 406, process 500 is performed for each determined candidate sentence-entity, for each gold sentence of the set of gold sentences 216.

As shown in FIG. 5, process 500 includes a dependency parsing step 506, a sentence graph representation step 512, a shortest path computation step 518, and a similarity function computation step 528.

Process 500 begins in step 506, which includes receiving a candidate sentence 502 and a gold sentence 504 by a dependency parser and generating a dependency tree 508 of the candidate sentence 502 and a dependency tree 510 of the gold sentence 504. A dependency tree is a tree structure that maps out the dependencies between the elements of the sentence.

The candidate sentence 502 is also provided to a NER function 520 which determines the entities contained in the candidate sentence 502 of the SET of the slot. The output 522 of the NER function 520 includes one or more candidate sentence-entity pairs. For the sake of simplification, it is assumed hereinafter that output 522 includes a single candidate sentence-entity pair. If multiple candidate sentence-entity pairs are present, then process 500 would include separate processing of each candidate sentence-entity pair in each of steps 518 and 528 further described below.

Next, the dependency trees 508 and 510 are used in step 512 to generate respectively a first graph representation 514 of the candidate sentence 502 and a second graph representation 516 of the gold sentence 504.

The first and second graph representations 514 and 516 are then used in step 518 to compute respectively a first shortest path 524, between the associated entity and the trigger word associated with the slot contained in the candidate sentence, and a second shortest path 526, between the name of the slot and the entity having the SET of the slot contained in the gold sentence. The first shortest path 524 and the second shortest path 526 may be an embodiment of the first and second relationships described above.

Process 500 terminates in step 528, which includes computing a similarity function 530 between the first shortest path 524 and the second shortest path 526. In an embodiment, the similarity function is a Simple Approximate Bigram Kernel (SABK) function.

A performance evaluation of an example embodiment of the present disclosure is now described. For the purpose of illustration, the example embodiment was compared to a conventional slot filling (SF) method. Since SF methods cannot handle descriptive documents where the target entity is implicitly described, the SF method was aided by providing it raw text as input. The raw text is split into sentences and then a NER is applied to recognize named entities. Only sentences containing the SET of the slot being filled and a trigger word from the list of trigger words associated with the slot are kept. From this set of sentences, the sentence that appears first in the raw text is selected and the entity with the SET contained in the sentence is returned as the slot value. The choice of selecting the first sentence appearing in the text is based on the hypothesis that the text typically begins by introducing or defining the different slots before providing further detail about them.

The performance evaluation was performed over 50 English-language investment fund prospectuses. 15 slots were identified to be filled from each prospectus:
  Asset management company
  Fund Administrator
  Transfer Agent
  Custodian
  Prime Broker
  Investment Advisor
  Promotor
  Denomination
  Depository
  Legal administrator
  Registrar
  Auditor
  Guarantor company
  Distributor The following trigger words (e.g., synonyms) were associated with each slot:

| Slot | Trigger words |
| --- | --- |
| Asset Management Company | Management company |
| | Asset management company |
| Fund Administrator | Administrative Agent |
| | Central Administration |
| | Administration |
| | Administrative management |
| Transfer Agent | Transfer Agent |
| Custodian | Custodian |
| Prime Broker | Prime Broker |
| Investment Advisor | Investment advisor |
| | Investment adviser |
| | Advisor |
| | Investment advice agreement |
| Promoter | Promotor |
| | Initiator |
| | Sponsor |
| | Promoter |
| Denomination | Name |
| Depository | Depositary |
| | Trustee |
| | Depository |
| Legal administrator | Corporate affairs |
| | Legal Advisor |
| | Legal Adviser |
| Registrar | Registrar |
| Auditor | Auditor |
| | Statutory auditors |
| Guarantor company | Guarantor company |
| | Guarantor |
| Distributor | Investment Manager Distributor |
| | Distributor |
| Investment Manager | Investment management function |
| | Investment Manager |

Given the ground truth answer and the answer returned by an algorithm, the accuracy was computed based on the Levenshtein distance. Namely, a matrix of Levenshtein distances is computed between each token of the ground truth answer and each token of the algorithm's answer (an answer includes one or more tokens, e.g., if the answer is 'Company A' then the tokens are 'Company' and 'A'). The 3 smallest distances are summed to provide a truncated Levenshtein distance. If the sum is smaller than a certain threshold, the algorithm's answer is considered correct and the algorithm's score is increased by 1. Otherwise, the algorithm's answer is considered incorrect and the algorithm's score is maintained the same. The threshold for the truncated Levenshtein distance was set to 2.5 after an analysis of some (ground truth answer, algorithm's answer) pairs.

The algorithm's accuracy was then calculated as the mean over the computed scores. Using this approach, the proposed algorithm had an accuracy of 79.73% for the above described scenario. In contrast, the SF method had an accuracy of 53.47%. It is noted however that the accuracy calculation of the SF method may be an overestimate. Unlike the proposed algorithm which always returns at most one answer, the SF method may return multiple answers for the same slot. The answer that is most similar to the ground truth answer (i.e., with the smallest truncated Levenshtein distance) was used in the accuracy calculation of the SF method, which may have improved its performance.

Figure 6:
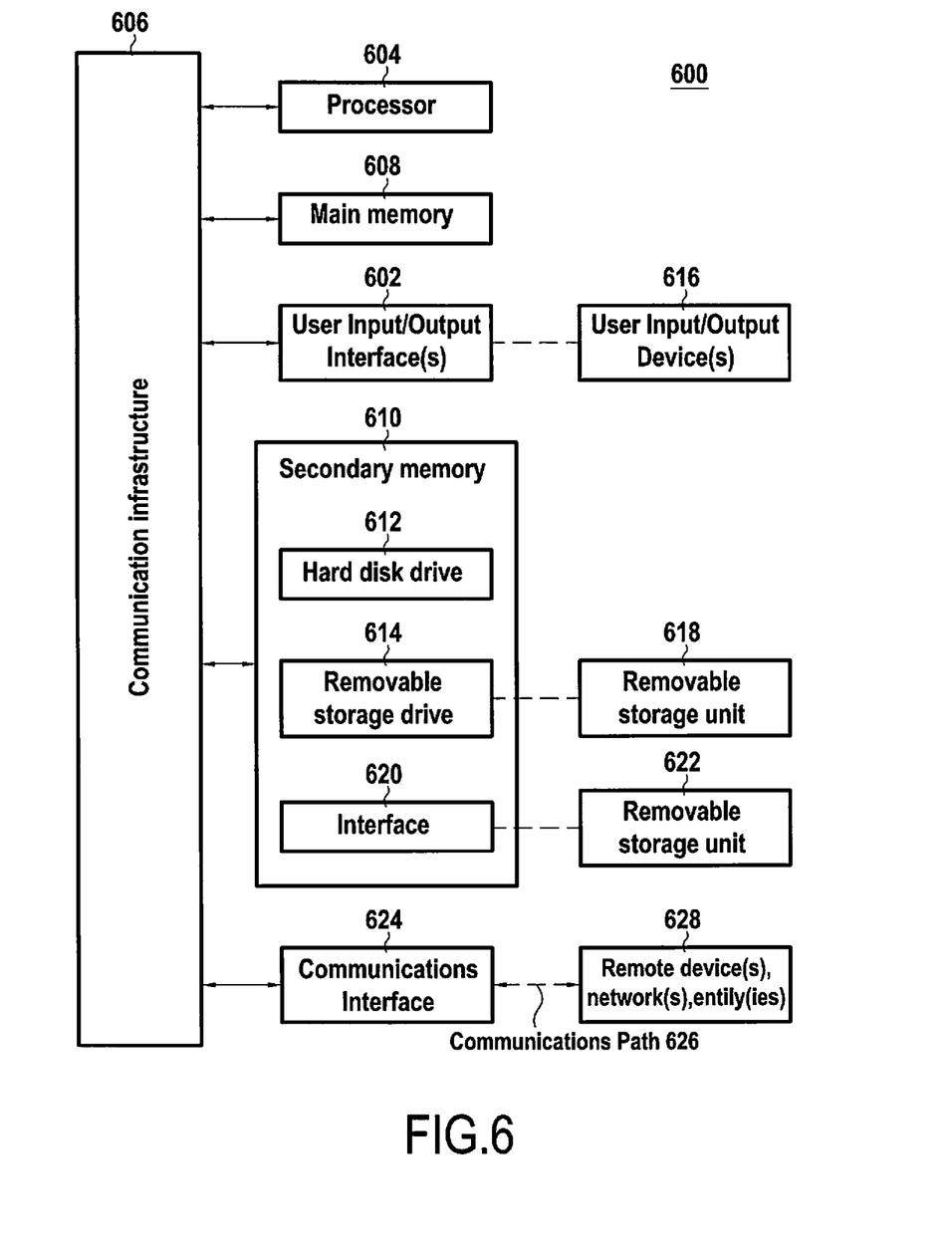
FIG. 6 illustrates an example computer system in which embodiments may be implemented according to an embodiment.

FIG. 6 illustrates an example computer system 600 in which embodiments may be implemented. Computer system 600 includes one or more processors (also called central processing units, or CPUs), such as a processor 604. Processor 604 is connected to a communication infrastructure or bus 606. Processor 604 may be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 616, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data that when executed by the one or more processors 604 perform the above described embodiments, including the processes described in FIGS. 1-5.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, a tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communications or network interface 624. Communications interface 624 enables computer system 600 to communicate and interact with any combination of remote devices, remote networks, remote entities, etc. (individually and collectively referenced by reference number 628). For example, communications interface 624 may allow computer system 600 to communicate with remote devices 628 over a communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the embodiments using data processing devices, computer systems and/or computer architectures other than that shown in FIG. 6.

ADDITIONAL VARIANTS

Although the present disclosure has been described above with reference to certain specific embodiments, it will be understood that the disclosure is not limited by the particularities of the specific embodiments. Numerous variations, modifications and developments may be made in the above-described embodiments within the scope of the appended claims.

The invention claimed is:

1. A method for extracting from a descriptive document the value of a slot associated with a target entity, comprising:
    splitting the descriptive document into a set of sentences;
    filtering the set of sentences to generate a set of candidate sentences, the set of candidate sentences each comprising at least one entity having a type that matches a slot entity type (SET) of the slot;
    determining candidate sentence-entity pairs from the set of candidate sentences, wherein each candidate sentence-entity pair includes a candidate sentence and an associated entity, the associated entity contained in the candidate sentence and having a type that matches the SET of the slot;
    calculating a plurality of similarity measures between the determined candidate sentence-entity pairs and a set of gold sentences associated with the slot, wherein calculating the plurality of similarity measures comprises:
        for each candidate sentence-entity pair of the determined candidate sentence-entity pairs, calculating a similarity measure with each gold sentence of the set of gold sentences;
    determining a candidate sentence-entity pair associated with a maximum similarity measure among the plurality of similarity measures; and
    assigning a value of the associated entity of the determined candidate sentence-entity pair to the slot.

2. The method of claim 1, wherein filtering the set of sentences to generate the set of candidate sentences comprises determining that a sentence of the set of sentences is a candidate sentence if the sentence comprises a trigger word associated with the slot.

3. The method of claim 2, wherein the trigger word includes a synonym of a name of the slot.

4. The method of claim 1, wherein filtering the set of sentences to generate the set of candidate sentences comprises:
    classifying a sentence of the set of sentences to determine a classifier output class for the sentence; and
    determining that the sentence is a candidate sentence if the classifier output class matches a tag associated with the slot.

5. The method of claim 1, wherein the set of gold sentences associated with the slot comprises sentences that contain the name of the slot.

6. The method of claim 5, further comprising replacing the name of the slot with the SET of the slot in the set of gold sentences.

7. The method of claim 1, wherein calculating a similarity measure with a gold sentence for a candidate sentence-entity pair comprises:
   determining, based on the candidate sentence of the candidate sentence-entity pair, a first relationship between the associated entity of the candidate sentence-entity pair and a trigger word associated with the slot contained in the candidate sentence;
   determining, based on the gold sentence, a second relationship between a name of the slot contained in the gold sentence and an entity contained in the gold sentence having the SET of the slot; and
   comparing the first relationship to the second relationship to determine the similarity measure between the gold sentence and the candidate sentence-entity pair.

8. The method of claim 7, wherein determining the first relationship comprises:
   generating a dependency tree of the candidate sentence; and
   computing, using the dependency tree of the candidate sentence, a first shortest path between the associated entity and the trigger word associated with the slot contained in the candidate sentence.

9. The method of claim 8, wherein determining the second relationship comprises:
   generating a dependency tree of the gold sentence; and
   computing, based on the dependency tree of the gold sentence, a second shortest path between the name of the slot and the entity contained in the gold sentence having the SET of the slot.

10. The method of claim 9, wherein comparing the first relationship to the second relationship comprises computing a similarity function between the first shortest path and the second shortest path.

11. The method of claim 10, wherein the similarity function is a Simple Approximate Bigram Kernel (SABK) function.

12. The method of claim 1, wherein the descriptive document is a prospectus describing an investment fund.

13. The method of claim 12, wherein the target entity is the name of the investment fund.

14. A non-transitory computer readable medium having control logic stored thereon, the control logic when executed by a processor causes the processor to perform a method for generating an executable code based on a descriptive document, the method comprising:
   splitting the descriptive document into a set of sentences;
   filtering the set of sentences to generate a set of candidate sentences, the set of candidate sentences each comprising at least one entity having a type that matches a slot entity type (SET) of the slot;
   determining candidate sentence-entity pairs from the set of candidate sentences, wherein each candidate sentence-entity pair includes a candidate sentence and an associated entity, the associated entity contained in the candidate sentence and having a type that matches the SET of the slot;
   calculating a plurality of similarity measures between the determined candidate sentence-entity pairs and a set of gold sentences associated with the slot, wherein calculating the plurality of similarity measures comprises:
      for each candidate sentence-entity pair of the determined candidate sentence-entity pairs, calculating a similarity measure with each gold sentence of the set of gold sentences;
   determining a candidate sentence-entity pair associated with a maximum similarity measure among the plurality of similarity measures; and
   assigning a value of the associated entity of the determined candidate sentence-entity pair to the slot.

15. The non-transitory computer readable medium of claim 14, wherein calculating a similarity measure with a gold sentence for a candidate sentence-entity pair comprises:
   determining, based on the candidate sentence of the candidate sentence-entity pair, a first relationship between the associated entity of the candidate sentence-entity pair and a trigger word associated with the slot contained in the candidate sentence;
   determining, based on the gold sentence, a second relationship between a name of the slot contained in the gold sentence and an entity contained in the gold sentence having the SET of the slot; and
   comparing the first relationship to the second relationship to determine the similarity measure between the gold sentence and the candidate sentence-entity pair.

16. The non-transitory computer readable medium of claim 15, wherein determining the first relationship comprises:
   generating a dependency tree of the candidate sentence; and
   computing, using the dependency tree of the candidate sentence, a first shortest path between the associated entity and the trigger word associated with the slot contained in the candidate sentence.

17. The non-transitory computer readable medium of claim 16, wherein determining the second relationship comprises:
   generating a dependency tree of the gold sentence; and
   computing, based on the dependency tree of the gold sentence, a second shortest path between the name of the slot and the entity contained in the gold sentence having the SET of the slot.

18. The non-transitory computer readable medium of claim 17, wherein comparing the first relationship to the second relationship comprises computing a similarity function between the first shortest path and the second shortest path.

19. The non-transitory computer readable medium of claim 14, wherein the descriptive document is a prospectus describing an investment fund.

20. A computer system, comprising:
   a processor; and
   a memory storing control logic, the control logic when executed by the processor causes the processor to perform a method for generating an executable code based on a descriptive document, the method comprising:
   splitting the descriptive document into a set of sentences;
   filtering the set of sentences to generate a set of candidate sentences, the set of candidate sentences each comprising at least one entity having a type that matches a slot entity type (SET) of the slot;
   determining candidate sentence-entity pairs from the set of candidate sentences, wherein each candidate sentence-entity pair includes a candidate sentence and an associated entity, the associated entity contained in the candidate sentence and having a type that matches the SET of the slot;

calculating a plurality of similarity measures between the determined candidate sentence-entity pairs and a set of gold sentences associated with the slot, wherein calculating the plurality of similarity measures comprises:
  for each candidate sentence-entity pair of the determined candidate sentence-entity pairs, calculating a similarity measure with each gold sentence of the set of gold sentences;
determining a candidate sentence-entity pair associated with a maximum similarity measure among the plurality of similarity measures; and
assigning a value of the associated entity of the determined candidate sentence-entity pair to the slot.

* * * * *